US005394180A

United States Patent [19]

Soucemarianadin et al.

[11] Patent Number: 5,394,180

[45] Date of Patent: Feb. 28, 1995

[54] MODULAR MULTIJET DEFLECTION HEAD AND MANUFACTURING METHOD

[75] Inventors: Arthur Soucemarianadin, St. Peray; Thierry Colombat, La Voulte, both of France

[73] Assignee: Imaje S.A., Bourg les Valence, France

[21] Appl. No.: 875,696

[22] Filed: Apr. 29, 1992

[30] Foreign Application Priority Data

May 3, 1991 [FR] France ............................ 91 05475

[51] Int. Cl.[6] ............................ G01D 15/18

[52] U.S. Cl. ............................ 347/77; 347/82

[58] Field of Search ............................ 347/77, 76, 74, 82

[56] References Cited

U.S. PATENT DOCUMENTS

| | | | |
|---|---|---|---|
| 3,790,953 | 2/1974 | Sugiya | 347/82 |
| 4,194,211 | 3/1980 | Hoffman | 347/76 |
| 4,321,608 | 3/1982 | Kakeno | 347/77 |
| 4,338,612 | 7/1982 | Nagayama . | |
| 4,620,195 | 10/1986 | Eblen . | |

FOREIGN PATENT DOCUMENTS 6082357 of 0000 Japan .

*Primary Examiner*—R. L. Moses
*Attorney, Agent, or Firm*—Roland Plottel

[57] ABSTRACT

In a printing device using m ink jets, a head for the deflection of said jets is made in modular form by the assembling of:

a first plurality of elements, each comprising m electrodes, a second plurality of elements for the separation of the elements of the first plurality, that are interposed between certain elements of the first plurality to separate these elements electrically from one another;

the elements of the first plurality and of the second plurality being aligned and stacked to form a compact assembly.

16 Claims, 6 Drawing Sheets

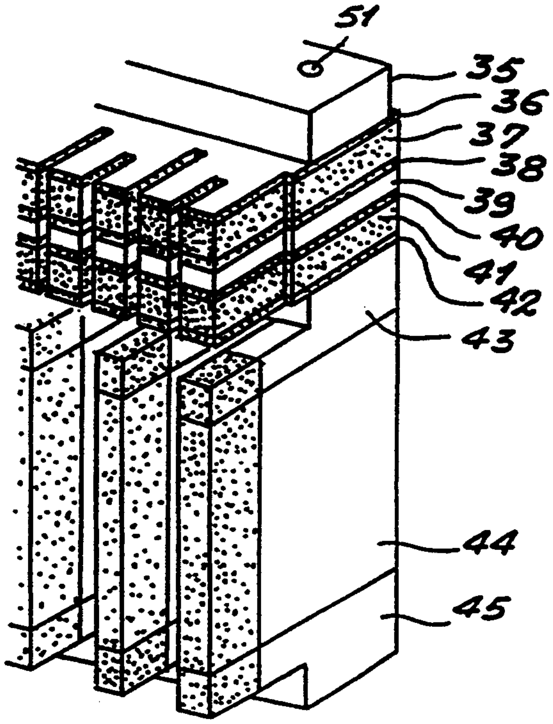
FIG.2
FIG.5
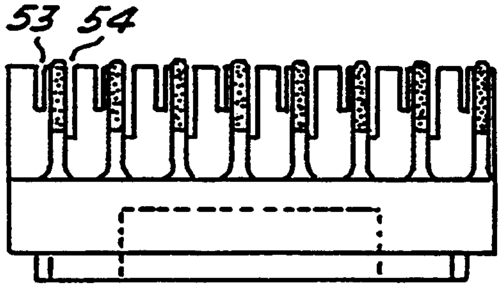
FIG.4
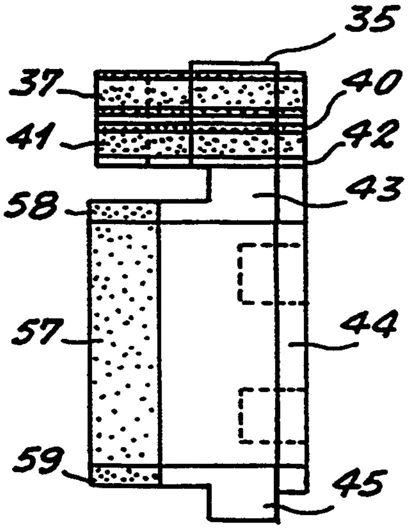
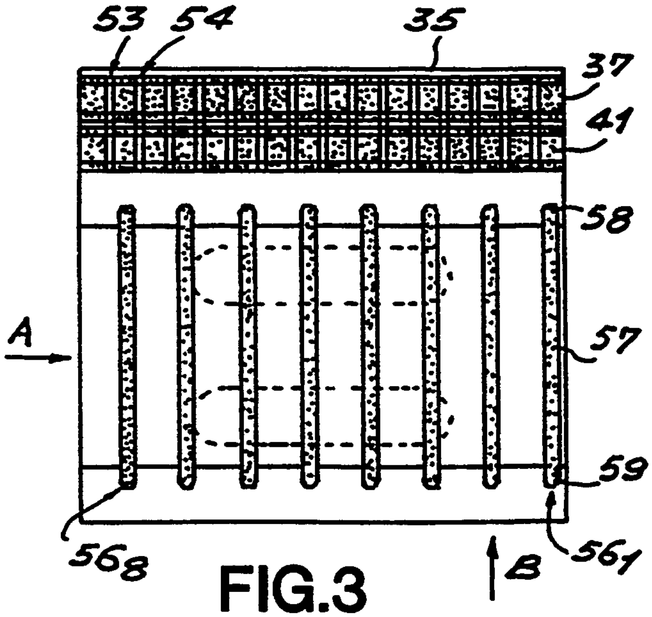
FIG.3

36"
37"
38"
39'
40"
41"
42"
53
53'
54
60'
61'
47
92
93
94
95
96

MODULAR MULTIJET DEFLECTION HEAD AND MANUFACTURING METHOD

BACKGROUND OF THE INVENTION

1. Field of the Invention

The invention relates to continuous deflected ink jet printing devices and, more particularly, in such devices, it relates to the part that has the function of acting electrically on the ink jet.

2. Description of the prior art

Deflected continuous ink jet printers are known, and one of them has been described in the French patent application No. 8913719 filed on 16th Oct. 1989 and entitled "Ink Jet Printing Head And Method For The Implementation Of This Head, Designed Notably For The Printing Of Large-Sized Characters".

In the above-mentioned patent, the head comprises the following in a single pack: at least two modulation elements comprising injection nozzles fed by a single ink circuit and a module for the recovery of unused drops, common to all the jets, with only one recovery outlet.

The single pack has a base used as a support for the modulation elements, charge electrodes, phase detection elements, and deflection electrodes, these different elements having to be aligned with a precision of the order of one-hundredth of a millimeter.

Now, such precision is very difficult to obtain when these elements are manufactured separately and then mounted on the base, and the difficulty of maintaining this precision increases with the number of ink jets of the printing head. Moreover, the number of adjustments to be made, notably adjustments of alignment, during the mounting and maintenance is high.

Besides, it can be seen that a printing head of this type is ill-suited to the making of a row of several tens of ink jets as the cost of manufacturing and maintaining such a system would be very high.

The object of the present invention is therefore the making, in a multijet printing device, of a deflection head, the manufacture of which is greatly simplified while, at the same time, it has high precision of positioning of the different elements.

Another object of the present invention is the making of a deflection head of the modular type that can be easily associated with one or more heads of the same type.

Another object of the present invention is the implementation of a method for the manufacture of modular type deflection heads.

SUMMARY OF THE INVENTION

The invention relates to a modular multijet deflection head for a printing device with m parallel ink jets comprising, per ink jet, a pair of charge electrodes, a pair of phase detection electrodes and a pair of deflection electrodes, said deflection head comprising:

a first plurality of elements, each comprising m electrodes, which are either charge electrodes or detection electrodes or deflection electrodes;

a second plurality of elements for the separation of the elements of the first plurality, that are interposed between the elements of the first plurality to separate the latter elements electrically from one another;

the elements of the first plurality and of the second plurality being aligned and stacked to form a compact assembly.

The invention also relates to a method for the manufacture of a modular multijet deflection head, wherein said method comprises the following main steps of:

(a) manufacturing seven elements bearing the m charge electrodes, the m phase detection electrodes, the metal shielding layers made of identical plates of insulating material and the assembling of these elements to form a first sub-assembly;

(b) manufacturing the elements bearing the deflection electrodes from a block of insulating material in which m metallized partitions are made to form a second sub-assembly;

(c) assembling the first and second sub-assemblies to obtain the deflection head.

BRIEF DESCRIPTION OF THE DRAWINGS

Other objects, features and advantages of the present invention shall appear from the following description of an exemplary embodiment, said description being made with reference to the appended drawings, of which:

FIG. 2 shows a perspective view of the modular multijet deflection head according to the invention, after the assembling of the different elements shown in FIG. 1;

FIG. 3 shows a front view of the modular multijet deflection head, after the assembling of the different elements shown in FIG. 1;

FIG. 4 shows a side view of the modular multijet deflection head along the arrow A of FIG. 3;

FIG. 5 shows a view of the modular multijet deflection head along the arrow B of FIG. 3;

MORE DETAILED DESCRIPTION

Figure 1:
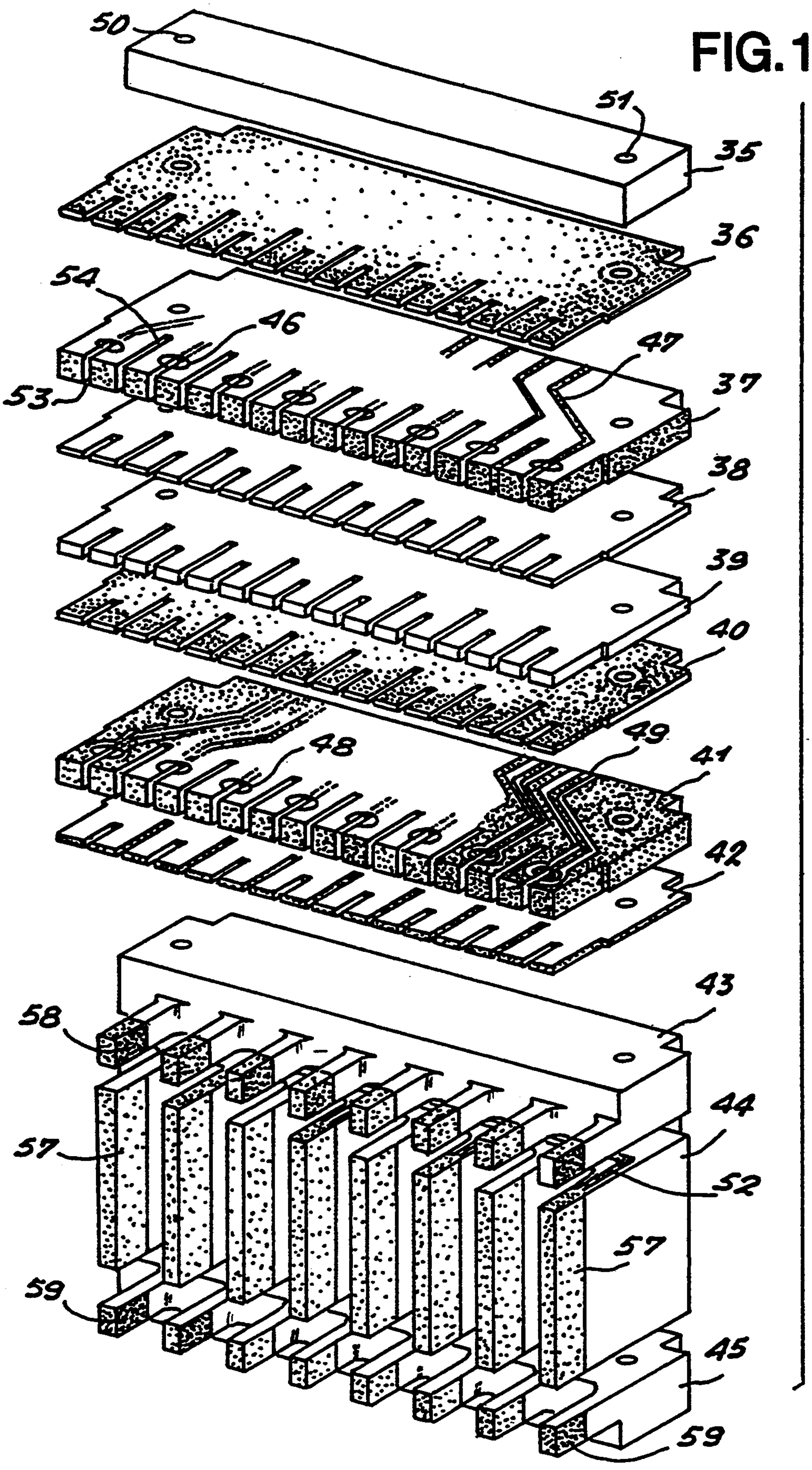
FIG. 1 shows an exploded view of a modular multijet deflection head according to the invention.

A modular multijet diffusion head, which is an object of the present invention, designed to deflect m=8 ink jets is constituted (FIGS. 1 to 5) by a stack of eleven elements 35 to 45 in the direction of movement of the non-deflected ink jets, certain elements referenced 37, 41, 43, 44 and 45, each constituting electrodes, while the other elements 35, 36, 38, 39, 40 and 42 constitute partition walls with particular functions. Each of these eleven elements has two holes such as those referenced 50 and 51 on the element 35 to be used for alignment during the assembling of said elements.

In the direction of the movement of the ink jet, the first element 35 is a shim made of insulating material that acts as a reference for the stacking of the other elements and for their positioning with respect to the device which gives the same ink jets.

The second element 36 is a first shielding plate made of an insulating material, the face on the shim 35 side of this first shielding plate, being metallized except around the alignment holes.

The third element 37 is a supporting plate for m=8 charge electrodes such as the one referenced 46 and their supply conductors such as the one referenced 47. These conductors are extended on the rear edge of the plate so that they can be connected to flexible conductors.

The fourth element 38 is a second shielding plate made of an insulating material, with its face on the side opposite that of the charge electrodes plate 37 being metallized except around the alignment holes.

The fifth element 39 is an electrical insulation spacer formed by a plate of insulating material.

The sixth element 40 is a third shielding plate made of an insulating material, the face, on the shim 35 side of this third shielding plate being metallized except around the alignment holes.

The seventh element 41 is a supporting plate for m=8 detection electrodes such as the one referenced 48 and their connecting conductors such as the one referenced 49. These conductors are extended on the rear edge of the plate so that they can be connected to flexible conductors.

The eighth element 42 is a fourth shielding plate made of an insulating material, with its face on the side opposite that of the detection electrodes plate 41 being metallized except around the alignment holes.

The elements 36 to 42 have slots drilled in them, parallel to the path of the non-deflected ink jets, some of these slots, referenced 53, having a depth sufficient to go partially through the electrodes 46 and 48 and thus to enable the passage of the ink jets while the others, referenced 54, have a greater depth than the preceding ones to demarcate spaces of equal width between the inserts and reduce interference among the jets.

The slots 53, corresponding to the electrodes are not metallized except at the position of the electrodes while the slots 54 are metallized throughout their depth.

The ninth, tenth and eleventh elements (43, 44 and 45) together constitute the electrodes for the deflection of the drops of the ink jets and are each made of blocks of insulating material in which deep grooves are used to separate partitions, the walls of which are metallized. The metallized walls of the tenth element 44 are connected to supply conductors such as those referenced 52.

The insulating material of the different elements is for example ceramic, the characteristics of which enable it to be machined, notably in thickness, with a precision of the order of some microns.

The four shielding plates 36, 38, 40 and 42 each have a thickness of 0.5 millimeter for example, and the metal layer is made of a noble material, for example a gold alloy, that provides for the prevention of electro-erosion and has a thicknesss of about 2 to 10 microns, preferably 2 to 4 microns.

The spacer 39 has a thickness of about 1 millimeter. In the element 37, the charge electrodes are made, for example, of metal inserts that are bonded inside holes drilled in the supporting plate. The thickness of these inserts is two millimeters for example. The supply conductors are formed by metal tracks having a thickness of about four microns. These metal tracks are connected to the inserts.

In the element 41, the detection electrodes are also formed by metal inserts that are bonded inside holes drilled in the supporting plate. The thickness of these inserts is two millimeters for example. The linking conductors are formed by metal tracks having a thickness of about four microns. These metal tracks are connected to the inserts. The rest of the supporting plate on the metal conductors side is metallized except on zones on either side of the inserts and of the metal tracks. The thickness of the metallization is about 4 to 15 microns.

The metal inserts should be made of a material that should have the following characteristics: an expansion coefficient close to that of the supporting plate, ease of metallization for the connections with the supply conductors and ease of machining for the drilling of the slots. This material is obtained, for example, by the sintering of at least one metallic powder.

As indicated here above, the deflection electrodes are constituted by three elements 43, 44 and 45 which, contrary to the other elements 35 to 42, are not insulating plates but insulating blocks. These are a central block 44, the metallized walls of which receive the high voltage of deflection through conductors referenced 52, and two other blocks, 43 and 45, positioned respectively upstream and downstream with respect to the direction of the ink jet. These electrodes constituted by the metallized walls of the blocks 43 and 45 are used to reduce the risk of breakdown.

Of the supply conductors 52, half are made on the input face of the block 40 and the other half on the output face of the block, so that two successive electrodes are supplied as follows: one by a conductor on the input face and the other by a conductor on the output face.

The manufacture of the modular multijet deflection head as described with reference to FIGS. 1 to 5 shall now be described with reference to the different view shown in FIGS. 6, 7 and 8.

Figure 6:
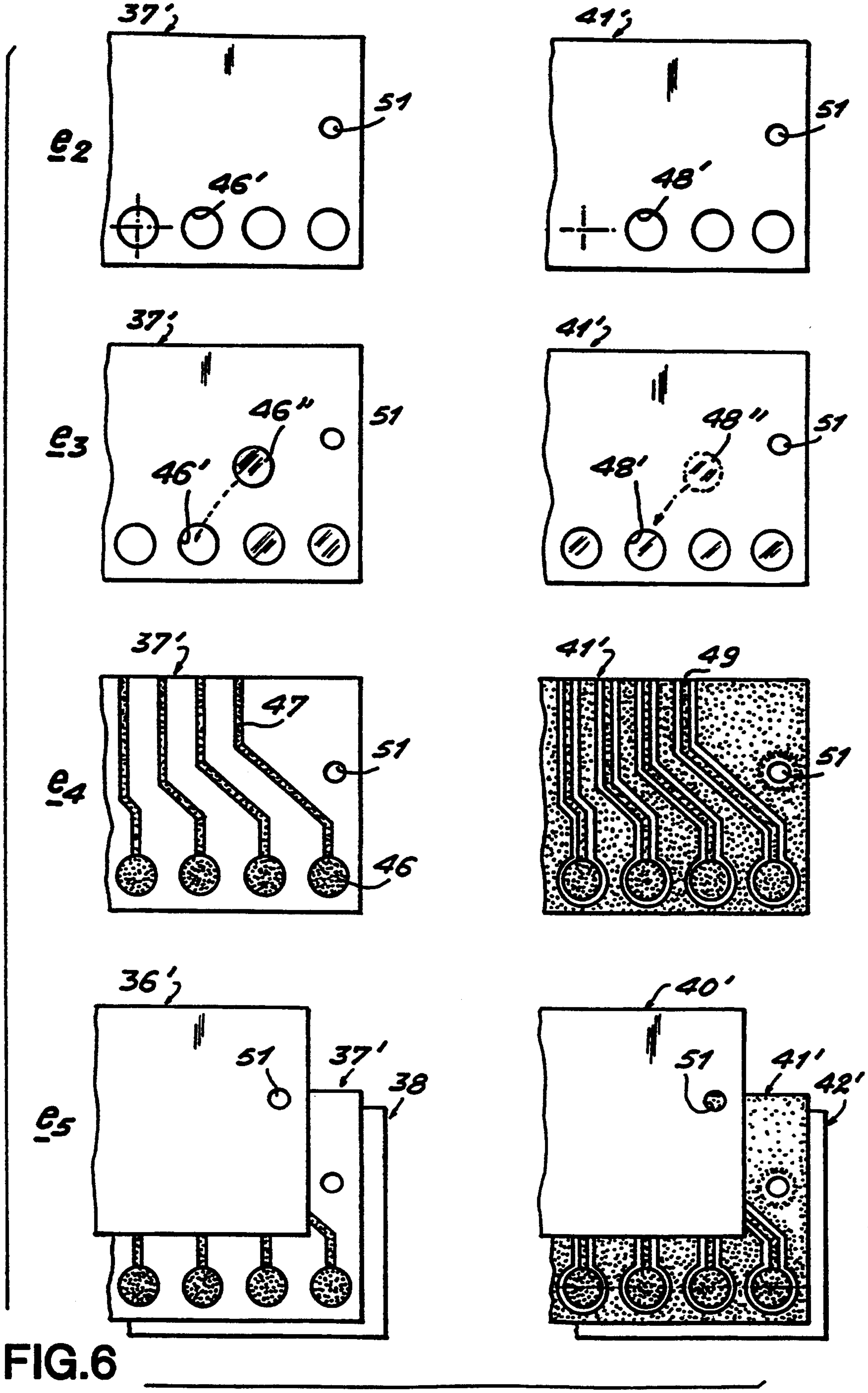
FIG. 6 is a first set of views showing different steps of the manufacturing method according to the invention.
Figure 7:
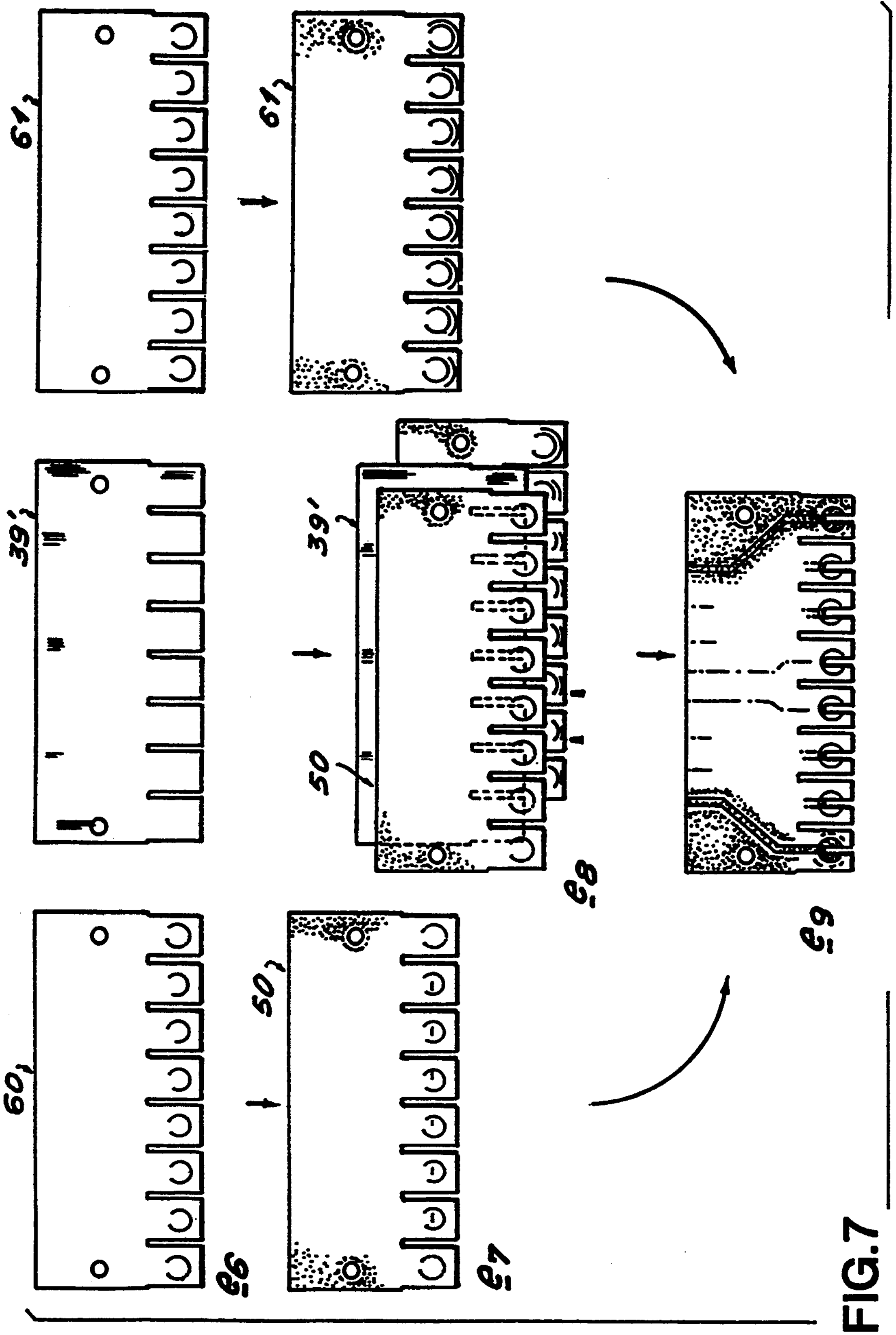
FIG. 7 is a second set of views showing other steps of the manufacturing method.
Figure 8:
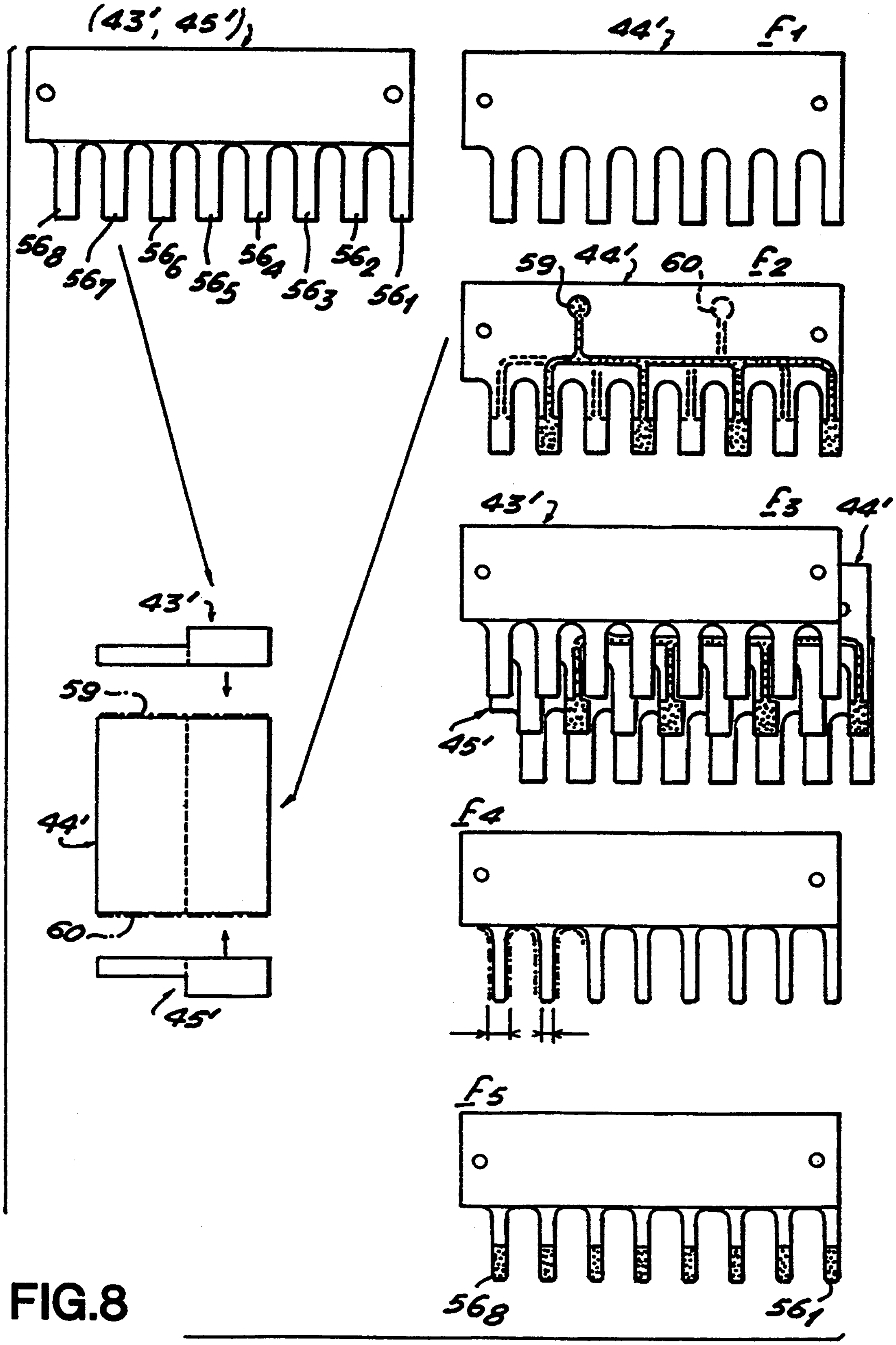
FIG. 8 is a third set of views showing other steps of the manufacturing method.

For the requirements of the description, this manufacturing method comprises three main steps:

(a) manufacturing, in a similar manner, the charge electrodes 37 and detection electrodes 41 and their assembling to obtain a first sub-assembly (FIGS. 6 and 7);

(b) manufacturing the deflection electrodes 43, 44 and 45 and their assembling to obtain a second sub-assembly (FIG. 8);

(c) assembling the first and second sub-assemblies to obtain a deflection head according to the invention (FIG. 2).

The main step (a) can be split up into several elementary sub-operations which are the following:

(e1) obtaining seven identical base plates 37', 38', 39', 40', 41' and 42' made of an insulator material such as ceramic with a thickness adapted to the function to be fulfilled: electrode function for the plates 37' and 41', shielding function for the plates 36', 38', 40' and 42' and insulation function for the plate 39'; it must be noted that each plate has centering holes 50 and 51;

(e2) drilling the holes 46' and 48' in the plates 37' and 41' corresponding respectively to the charge and detection electrodes;

(e3) placing the metal inserts 46'' and 48'' in the holes 46' and 48' respectively;

(e4) metallizing the tracks on the plates 37' and 41' to obtain conductors 47 and 49 and the shielding between the conductors 49 and the plate 41', the holes 50 and 51 being not metallized;

(e5) assembling, by bonding, the plates 36', 37' and 38', on the one hand, and the plates 40', 41' and 42', on the other hand, the alignment being obtained by the centering holes 50 and 51 to obtain the blocks 60 and 61 respectively;

(e6) machining the large slots 54 on each block 60 and 61 resulting from the preceding operation as well as on an insulating plate 39';

(e7) metallizing each block 60 and 61 to cover the external face of the plates 36, 38 and 40, 42 as well as the large slots 54 with a metal layer;

(e8) assembling the blocks 60 and 61 in interposing the insulating plate 39';

(e9) machining the small slots 53.

The main step (b) can be split up into several elementary sub-operations which are the following:

(f1) obtaining three identical base blocks 43', 44' and 45' made of an insulating material such as ceramic, with a thickness adapted to the function to be fulfilled: a block 44' having a thickness of about 15 millimeters for the deflection and two blocks 43' and 45' having a thickness of two to five millimeters to reduce the risks of breakdown. These blocks may be sawed out of a single block ot maybe three blocks obtained separately. This single block or these three blocks have a base 55 which is extended, on one side, by partitions, teeth or lugs, referenced $56_1$ to $56_8$, which form a comb. They may be obtained either by molding or by a first rudimentary machining operation.

(f2) metallizing to obtain the tracks 52 on the upstream face and the downstream face of the central block 44', the different points of a face being connected to a common input terminal 59 for the upstream face or 60 for the downstream face;

(f3) assembling, by bonding, the three blocks 43', 44' and 45';

(f4) precise machining of the partitions;

(f5) metallizing of the lugs $56_1$ to $56_8$ on a depth of five to ten millimeters and on their entire length.

When these two main steps (a) and (b) are ended, the main step (c) for assembling the two sub-assemblies may be carried out by bonding and alignment by means of the holes 50 and 51.

Naturally, the alignment holes 50 and 51 are not necessary as other well-known alignment methods can be implemented.

The method that has just been described may have several variants, and one of them shall be described with reference to FIGS. 9 and 10.

Essentially, in this variant, the metal inserts 46" and 48" are not used. Rather, the electrodes 46 and 48 are obtained by metal deposits at the position of the small slots 53, including inside said slots as can be seen in FIG. 10.

Figures 9, 10:
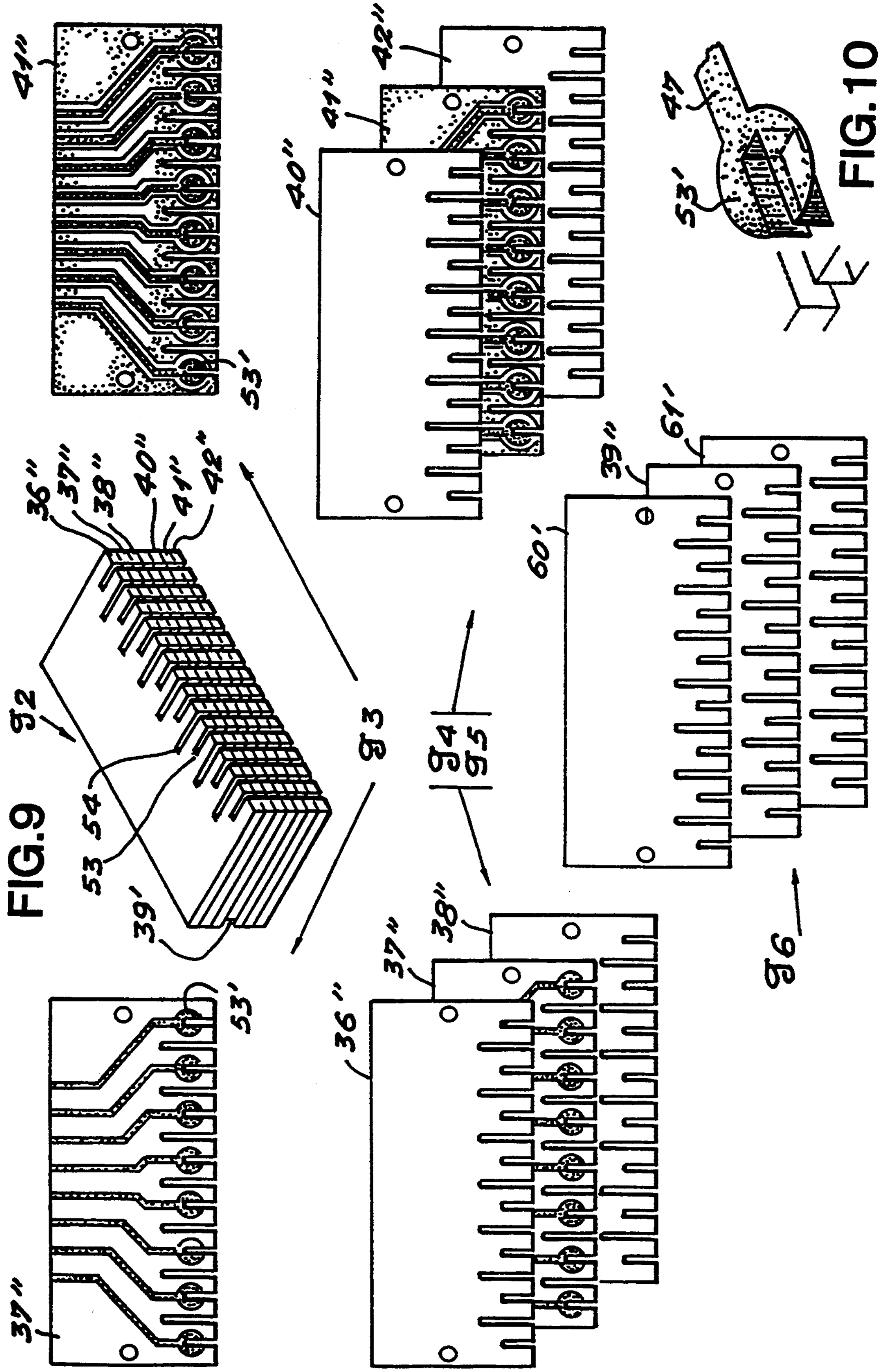
FIG. 9 is a set of views showing a variant of the method according to the invention.
FIG. 10 shows a perspective view of a charge or detection electrode made according to the variant of the method according to the invention.

In this FIG. 10, the internal edges of the slot 43 at the bottom are metallized, and these metallized edges get connected to metal layers 53', with a more or less circular shape, that are connected to the supply conductor 47. An arrangement such as this enables the making of two electrodes and their supply conductor in only one metallizing operation.

The manufacturing method is modified accordingly, but this modification affects only the making of the block of charge electrodes and the block of detection electrodes. The other steps of the method, relating to the making of the deflection electrodes, remains unchanged. To this effect, the main step (a) is split up into several elementary sub-operations which are the following:

(g1) obtaining seven identical base plates 37", 38", 39", 40", 41" and 42", made of an insulating material such as ceramic with a thickness adapted to the function to be fulfilled: electrode function for the plates 37" and 41", shielding function for the plates 36", 38", 40" and 42" and insulation function for the plate 39";

(g2) assembling the seven plates 36" to 42" for the machining of the small slots 53 and the large slots 54;

(g3) metallizing each plate 37" and 41" to obtain, in only one operation, the electrodes 53', proper, their supply conductors 47 and 49 and the shielding metallization between the conductors 49 and the electrodes 53', of the plate 41"; it must be noted that the internal edges of the slots 53 are not metallized at their input;

(g4) assembling, by bonding, the plates 36", 37" and 38", on the one hand, and the plates 40", 41" and 42", on the other hand, to obtain the blocks 60 and 61 respectively;

(g5) metallizing each block 60' and 61' to cover the external face of the plates 36", 38" and 40", 42" with a metal layer;

(g6) assembling the blocks 60 and 61' in interposing the insulating plate 39".

Compared with the method described with reference to FIGS. 6 to 8, this variant therefore comprises a reduction in the number of operations as well as a simplification of these operations. The modular multijet deflection head that has been described easily lends itself to a side-by-side assembling of a plurality n of heads so as to obtain a row of m×n heads enabling the deflection of m×n ink jets. Naturally, to this end, the lateral edges of each module should be designed accordingly, notably so as to be in keeping with the spacing of the electrodes between one module and the next one and between one module and the preceding one.

What is claimed is:

1. A modular multijet deflection head for a printing device with m parallel ink jets comprising, per ink jet, a pair of charge electrodes, a pair of phase detection electrodes and a pair of deflection electrodes, said deflection head comprising:

a first plurality of elements, each comprising m electrodes, a second plurality of elements for the separation of the elements of the first plurality, that are interposed between certain elements of the first plurality to separate these elements electrically from one another;

the elements of the first plurality and of the second plurality being aligned and stacked to form a compact assembly.

2. A deflection head according to claim 1, wherein each element of the first plurality is constituted by a block of insulating material in which the m electrodes and their supply conductors are made.

3. A deflection head according to claim 1 wherein, for the charge electrodes and the detection electrodes, the insulating block is a plate, in the thickness of which there are inserted the m electrodes in the form of conductive wafers, one of the faces of the plate comprising the m supply conductors.

4. A deflection head according to claim 2 wherein, for the charge electrodes and the detection electrode, the insulating block is a plate comprising at least m parallel slots, of which the bottom of the internal edges as well as a surface zone are metallized, said zone being connected to the corresponding supply conductor and to the metal layer of the internal edges of the slot.

5. A deflection head according to claim 3 or 4 wherein, for the deflection electrodes, the insulator block is constituted by a base extending on one side by partitions that are parallel to one another and to the path of the non-deflected ink jet, said partitions being coated on either side with a conductive layer that is connected to a supply conductor positioned on one of the edges of each partition.

6. A deflection head according to claim 5, wherein the insulating block of the deflection electrodes is divided into three parts in the direction of the path of the ink jet, a central part comprising supply conductors as well as an upstream part and a downstream part without supply conductor that are positioned on either side of the central part.

7. A deflection head according to any one of claims 3 or 4 wherein the plate bearing the charge electrodes and the plate bearing the detection electrodes are sandwiched between at least two elements of the second plurality, each of the two elements of the second plurality being constituted by a plate, of which the face opposite the one in contact with the electrode plate is coated with a metal layer.

8. A deflection head according to claim 7, wherein the downstream shielding plate associated with the charge electrodes plate is separated from the shielding plate associated with the detection plate by an insulating plate of the second plurality.

9. A deflection head according to claim 8, wherein the shielding plate associated with the detection electrode plate is separated from the central part of the deflection electrodes by said upstream part of said deflection electrodes.

10. A deflection head according to claim 8, wherein the assembly constituted by the plate bearing the charge electrodes, the plate bearing the detection electrodes, the shielding plates and the insulation plate comprise at least m first slots that are parallel to one another and perpendicular to the plane of the path of the jets, each slot corresponding to the path of each ink jet.

11. A deflection head according to claim 10, wherein the assembly constituted by the plate bearing the charge electrodes, the plate bearing the detection electrodes, the shielding plates and the insulation plate further comprise second slots parallel to one another and to the first slots.

12. A deflection head according to claim 11, wherein the second slots are deeper than the first slots.

13. A method for the manufacture of a modular multijet deflection head for a printing device with m parallel ink jets that are deflected in a plane, wherein said method comprises the following main steps of:

(a) manufacturing seven elements bearing the m charge electrodes, the m detection electrodes, the metal shielding layers made of identical plates of insulating material and the assembling of these elements to form a first sub-assembly;

(b) manufacturing the elements bearing the deflection electrodes from a block of insulating material in which m metallized partitions are made to form a second sub-assembly;

(c) assembling the first and second sub-assemblies to obtain the deflection head.

14. A method according to claim 13, wherein the main step (a) comprises the following sub-steps:

(el) making seven base plates of an insulating material, said base plates having an identical shape but different thicknesses;

(e2) drilling m equidistant holes in two of the seven plates to place the charge electrodes on one of them and the detection electrodes on the other;

(e3) placing m metal inserts in the two plates resulting from the above operation;

(e4) depositing tracks connected to said inserts as well as of the metal layer around the inserts and tracks of the plate bearing the detection electrodes.

(e5) assembling each plate of electrodes thus obtained with two plates having no metal deposition and positioned, on either side of said plate of electrodes so as to obtain first and second blocks.

(e6) making slots in each block obtained by the above sub-step so as to separate the adjacent metal inserts by a space;

(e7) metallizing the two blocks resulting from the above operation to cover the external face of said blocks with a metal layer;

(e8) assembling the two blocks resulting from the operation e7 by interposing an insulating plate between them so as to obtain the first sub-assembly, and (e9) making m slots in the first sub-assembly so as to separate m metal inserts into two parts.

15. A method according to claim 13, wherein the main step (a) comprises the following sub-steps:

(g1) obtaining seven identical base plates made of an insulating material such as ceramic with a thickness adapted to the function to be fulfilled: electrode function for certain plates, shielding function for other plates and insulation function for one plate;

(g2) assembling the seven plates for the machining of the small slots and the large slots;

(g3) metallizing each electrode plate to obtain, in only one operation, the electrodes, their supply conductors and the shielding metallization between the conductors and the electrodes of one of the electrode plates;

(g4) assembling, by bonding, certain plates, on the one hand, and of other plates, on the other hand, to obtain two blocks respectively;

(g5) metallizing each block to cover the external face of the plates with a metal layer;

(g5) assembling the blocks by interposing the insulating plate.

16. A method according to claim 13 or 14 or 15, wherein the main step (b) comprises the following sub-steps:

(f1) making three identical base blocks, a central block and two lateral blocks made of insulating material, each comprising m parallel partitions separated by an identical space;

(f2) depositing m conductive tracks 52 on the edges of the partitions with the greatest length;

(f3) assembling the three blocks so that the partitions are aligned and so that the central block is positioned between the other two lateral blocks;

(f4) depositing a conductive layer on the two faces of the partitions of the three assembled blocks.

* * * * *